United States Patent
Song et al.

(10) Patent No.: US 8,045,514 B2
(45) Date of Patent: Oct. 25, 2011

(54) TRANSMITTING FRAMES IN WIRELESS LOCAL AREA NETWORK (WLAN)

(75) Inventors: Hak-Hoon Song, Seoul (KR); Min-Cheul Cha, Seongnam-si (KR); Bo-Seung Hwang, Yongin-si (KR); Seong-Jae Min, Seoul (KR); Myeon-Kee Youn, Incheon (KR); Joo-Yong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1451 days.

(21) Appl. No.: 11/474,478

(22) Filed: Jun. 26, 2006

(65) Prior Publication Data

US 2007/0041334 A1    Feb. 22, 2007

(30) Foreign Application Priority Data

Aug. 19, 2005    (KR) .................. 10-2005-0076310

(51) Int. Cl.
*H04B 7/04* (2006.01)
*H04B 7/204* (2006.01)
*H04W 76/02* (2009.01)

(52) U.S. Cl. .................. 370/329; 370/338; 370/345

(58) Field of Classification Search .................. None
See application file for complete search history.

(56) References Cited

U.S. PATENT DOCUMENTS

| | | | | |
|---|---|---|---|---|
| 5,661,727 A * | 8/1997 | Kermani et al. | ............ | 370/445 |
| 5,812,531 A * | 9/1998 | Cheung et al. | ............ | 370/255 |
| 5,889,772 A * | 3/1999 | Fischer et al. | ............ | 370/346 |
| 6,434,112 B1 * | 8/2002 | Kwon | ............ | 370/216 |
| 7,184,407 B1 * | 2/2007 | Myles et al. | ............ | 370/242 |
| 7,248,568 B1 * | 7/2007 | Loc et al. | ............ | 370/312 |
| 7,359,989 B2 * | 4/2008 | Orava et al. | ............ | 709/245 |
| 7,774,013 B2 * | 8/2010 | Backes et al. | ............ | 455/522 |
| 2003/0103521 A1 * | 6/2003 | Raphaeli et al. | ............ | 370/445 |
| 2003/0123405 A1 * | 7/2003 | del Prado et al. | ............ | 370/331 |
| 2003/0227914 A1 * | 12/2003 | Nguyen | ............ | 370/386 |
| 2004/0110530 A1 * | 6/2004 | Alone et al. | ............ | 455/552.1 |
| 2004/0264475 A1 * | 12/2004 | Kowalski | ............ | 370/395.5 |
| 2005/0030918 A1 * | 2/2005 | Motegi et al. | ............ | 370/328 |
| 2005/0075142 A1 * | 4/2005 | Hoffmann et al. | ............ | 455/562.1 |
| 2006/0007935 A1 * | 1/2006 | Bennett et al. | ............ | 370/395.5 |
| 2006/0030290 A1 * | 2/2006 | Rudolf et al. | ............ | 455/404.1 |
| 2006/0111045 A1 * | 5/2006 | Orlassino et al. | ............ | 455/41.2 |
| 2006/0168204 A1 * | 7/2006 | Appelman et al. | ............ | 709/224 |
| 2007/0002804 A1 * | 1/2007 | Xiong et al. | ............ | 370/335 |
| 2007/0010237 A1 * | 1/2007 | Jones et al. | ............ | 455/422.1 |
| 2007/0077936 A1 * | 4/2007 | Tomisawa et al. | ............ | 455/450 |

OTHER PUBLICATIONS

IEEE Computer Society, "IEEE Standard for Information Technology-Telecommunications and information exchange between systems-Local and metropolitan area networks-Specific requirements, Part 11: Wireless LAN Medium Access Control (MAC) and Physical Layer (PHY) Specifications", IEEE Std 802.11, Jun. 12, 2007, pp. 1-724.

* cited by examiner

*Primary Examiner* — Rafael Pérez-Gutiérrez
*Assistant Examiner* — Frank Donado
(74) *Attorney, Agent, or Firm* — H.C. Park & Associates, PLC

(57) ABSTRACT

A method and apparatus for transmitting frames in a Wireless Local Area Network (WLAN), each station in the WLAN determines whether there is another station in a hidden state. The station transmits a frame to an Access Point (AP) without performing an Request To Send/Clear To Send (RTS/CTS) mechanism when there is another station in a hidden state, thereby improving use efficiency of the wireless network and minimizing frame transmission delay.

30 Claims, 11 Drawing Sheets

FIG. 6

| Order | Information |
|---|---|
| 1 | Timestamp |
| 2 | Beacon interval |
| 3 | Capability information |
| 4 | SSID |
| 5 | Supported rates |
| 6 | FH Parameter Set |
| 7 | DS Parameter Set |
| 8 | CF Parameter Set |
| 9 | IBSS Parameter Set |
| 10 | TIM |
| ⋮ | ⋮ |
| N | STATION STATE TABLE |

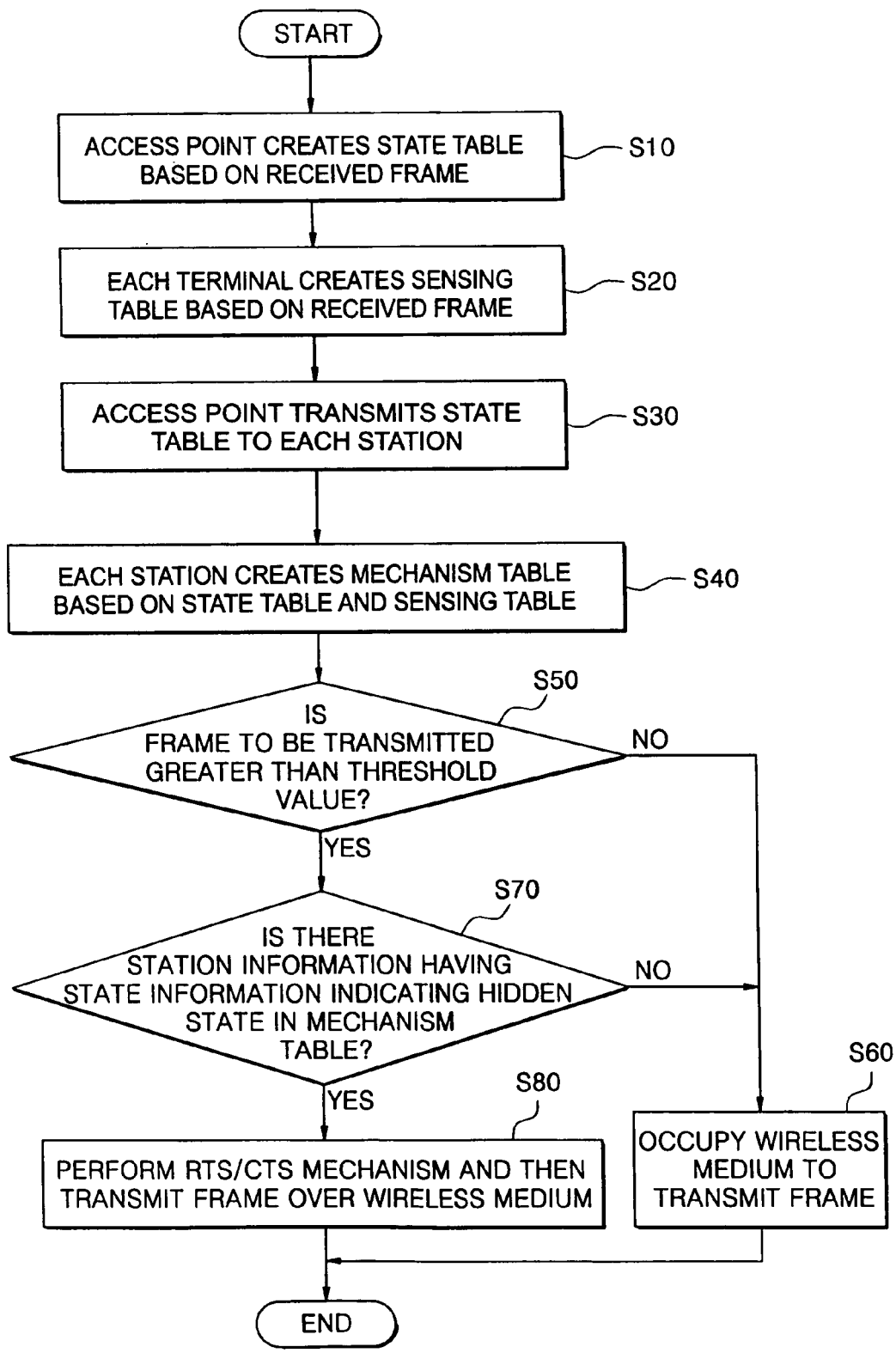

TRANSMITTING FRAMES IN WIRELESS LOCAL AREA NETWORK (WLAN)

CLAIM OF PRIORITY

This application makes reference to, incorporates the same herein, and claims all benefits accruing under 35 U.S.C. §119 from an application for APPARATUS AND METHOD OF FRAME TRANSMITTING IN WIRELESS LAN SYSTEM, earlier filed in the Korean Intellectual Property Office on 19 Aug. 2005 and there duly assigned Serial No. 10-2005-0076310.

BACKGROUND OF THE INVENTION

1. Field of the Invention

The present invention relates to a method and apparatus for transmitting frames in a Wireless Local Area Network (WLAN).

2. Description of the Related Art

In WLANs based on the IEEE 802.11 standard, a medium is occupied using a Carrier Sense Multiple Access/Collision Avoidance (CSMA/CA) protocol.

In the CSMA/CA protocol, each station within a Base Service Set (BSS) senses a medium, and accesses the medium when other stations do not occupy the medium.

However, if the stations are apart from one another over a medium sensing range, one station cannot recognize whether another station occupies the medium.

In a WLAN, first, second, and third stations are in a service area of an AP. That is, the AP is in a sensing range of each station.

The second station can be in a sensing range of the first station while the third station is not. The first station and the third station can be in a sensing range of the second station.

That is, the first station can sense whether the second station occupies a wireless medium with the AP, but cannot sense whether the third station occupies the medium.

Similarly, the third station can sense whether the second station occupies the medium with the AP, but cannot sense whether the first station occupies the medium.

Accordingly, the first station and the third station can simultaneously attempt to occupy the wireless medium when the second station does not occupy the wireless medium.

A collision caused by simultaneous accesses of multiple stations to a wireless medium is called a "hidden node problem."

In order to solve the "hidden node problem," the IEEE 802.11 suggests a Request To Send/Clear To Send (RTS/CTS) mechanism.

According to the RTS/CTS mechanism, the station is forced to exchange a short frame (e.g., RTS frame, CTS frame, etc.) with the AP to block other stations from accessing the medium when the station transmits a frame longer than a set frame threshold (dot11RTSThreshold) value.

In the RTS/CTS mechanism, each station to transmit a frame longer than a threshold value first transmits an RTS frame to the AP and, upon receipt of the RTS frame, the AP broadcasts a CTS frame to the station in its service area.

In response to receiving the CTS frame, each station waits without occupying the wireless medium, and the station transmitting the RTS frame occupies the wireless medium to transmit a frame.

In the RTS/CTS mechanism, the threshold value can be arbitrarily set. The RTS/CTS mechanism can or cannot be used for all frames depending on the threshold value.

The RTS/CTS mechanism can partially solve the "hidden node problem." However, when all stations transmit a frame longer than the threshold value, they are always required to process the RTS/CTS mechanism, thereby degrading use efficiency of wireless network resources and causing frame transmission delay by an RTS/CTS mechanism performance time.

For example, it is unnecessary for a station that can sense whether each station in the service area of the AP occupies the medium, like the second station, to perform the RTS/CTS mechanism in order to transmit a frame.

Accordingly, there is a need for a method capable of allowing each station in a WLAN to solve a "hidden node problem" through the RTS/CTS mechanism, maximizing use efficiency of a wireless network, and minimizing frame transmission delay.

SUMMARY OF THE INVENTION

Therefore, the present invention has been made to solve the aforementioned problems. It is an object of the present invention to provide a method and apparatus for transmitting frames in a Wireless Local Area Network (WLAN), capable of allowing stations in a service area of the same Access Point (AP) to transmit a frame without performing an unnecessary procedure depending on their state.

According to an aspect of the present invention, a wireless local area network (WLAN) system is provided including: at least one station; an Access Point (AP) adapted to recognize frame transmission state information of a station based on a frame received from the station and to broadcast the frame transmission state information to each station; and the at least one station adapted to recognize wireless medium sensing information of other stations from frames sensed over a wireless network, to generate mechanism determination information based on the frame transmission state information received from the AP and the wireless medium sensing information, and to perform a mechanism based on the mechanism determination information or to directly occupy the wireless medium to transmit the frame to the AP upon there being a frame to be transmitted to the AP.

The AP preferably includes: a state manager adapted to create a state table, the state table including frame transmission state information of each station obtained by comparing frame reception time information to first time information and to address information; and a message processor adapted to broadcast the frame transmission state information and the address information of each station included in the state table to each station.

The state manager is preferably adapted to parse at least one address field of the received frame, and to store the address information and the frame transmission state information corresponding to each station in the state table upon Base Service Set Identification (BSS ID) information being the same as BSS ID information of the AP.

The state manager is preferably adapted to either update or add the address information and the frame transmission state information included in the state table upon receipt of the frame.

The message processor is preferably adapted to transmit to each station either the address information of each station or the frame transmission state information via a beacon message transmitted to each station in a predetermined period or via an association response message corresponding to an association request message received from each station.

The state manager is preferably adapted to label frame transmission state information of a station having the address information as OFF state information upon difference time information between the frame reception time information and current time information being greater than a first time, and to label the frame transmission state information as ON state information upon the difference time information being smaller than the first time.

Each station preferably includes: a sensing manager adapted to create a sensing table, the sensing table including both wireless medium sensing information obtained by comparing the frame sensing time information to a second time information, and address information; a mechanism manager adapted to map the sensing information to the state information received from the AP to generate mechanism determination information of each station; and a mechanism processor adapted to perform a mechanism according to the mechanism determination information or to directly occupy the wireless medium to transmit the frame to the AP upon there being a frame to be transmitted to the AP.

The sensing manager is preferably adapted to parse at least one address field of the sensed frame, and to store address information and wireless medium sensing information corresponding to each station in the state table upon BSS ID information being the same as BSS ID information of the station. The sensing manager is preferably adapted to either update or add the address information and the wireless medium sensing information included in the sensing table upon receipt of the frame. The sensing manager is preferably adapted to label the wireless medium sensing information of a station having the address information as hidden state information upon difference time information between the sensing time information and the current time information being greater than a second time, and to label the wireless medium sensing information as sense state information upon the difference time information being smaller than the second time.

The mechanism manager is preferably adapted to label mechanism determination information as information requiring a mechanism upon there being address information of a station having the frame transmission state information indicating ON state information and the wireless medium sensing information indicating hidden state information, and to label the mechanism determination information as information requiring no mechanism upon there being no address information of a station having the frame transmission state information indicating ON state information and the wireless medium sensing information indicating hidden state information. The mechanism manager is preferably adapted to label the mechanism determination information as information requiring a mechanism upon the same address information as the address information of the station having the frame transmission state information indicating the ON state information not being included in the sensing table.

The mechanism processor is preferably adapted to perform a Request To Send/Clear To Send (RTS/CTS) mechanism to transmit the frame to the AP upon the mechanism determination information being information requiring a mechanism, and to occupy the wireless medium to transmit the frame to the AP upon the mechanism determination information being information requiring no mechanism. The mechanism processor is preferably adapted to occupy the wireless medium to transmit the frame upon the length of the frame being smaller than a preset threshold value, and to check the mechanism determination information upon the length of the frame being greater than the preset threshold value.

According to another aspect of the present invention, a frame transmission method in a Wireless Local Area Network (WLAN) including at least one station and an Access Point (AP) is provided, the method including: recognizing, by the AP, frame transmission state information of a station based on a frame received from a station and broadcasting the frame transmission state information and address information to each station; recognizing, by each station, wireless medium sensing information and address information of other stations from sensed frames; generating, by each station, mechanism determination information based on the frame transmission state information received from the AP and the wireless medium sensing information; and checking, by each station, the mechanism determination information to either transmit the frame to the AP through a mechanism or to occupy the wireless medium and transmit the frame to the AP upon there being a frame to be transmitted to the AP.

Recognizing the frame transmission state information preferably includes: parsing, by the AP, at least one address field of the frame; checking address information of the station transmitting the frame and frame reception time information upon Base Service Set Identification (BSS ID) information of the frame being the same as BSS ID information of each station; and labeling the frame transmission state information corresponding to each station based on a result of a comparison of difference time information between the reception time information and the current time information to a first set time information.

Labeling the frame transmission state information preferably includes: labeling frame transmission state information of a station having the address information as OFF state information upon the difference time information between the frame reception time information and the current time information being greater the first time; and labeling the frame transmission state information of the station having the address information as ON state information upon the difference time information between the frame reception time information and the current time information being smaller than the first time.

Recognizing the wireless medium sensing information preferably includes: parsing, by each station, at least one address field of the sensed frame; checking address information of the station transmitting the frame and frame sensing time information upon BSS ID information of the frame being the same as BSS ID information of a service area of the station; and labeling the wireless medium sensing information corresponding to each station based on a result of comparison of difference time information between the sensing time information and the current time information to second set time information.

Labeling the wireless medium sensing information preferably includes: labeling the wireless medium sensing information of the station having the address information as hidden information upon the difference time information between the frame sensing time information and the current time information being greater than the second time; and labeling the wireless medium sensing information of the station having the address information as sense information upon the difference time information between the frame sensing time information and the current time information being smaller than the second time.

Generating the mechanism determination information preferably includes mapping the frame transmission state information to the wireless medium sensing information according to the address information of each station to generate information requiring a mechanism upon there being the same address information having state information indicating ON state information and the wireless medium sensing information indicating hidden sensing information, and to generate information requiring no mechanism upon there being no same address information having state information indicating ON state information and the wireless medium sensing information indicating hidden sensing information.

The method preferably includes generating information requiring no mechanism upon the frame transmission state information of the address information received from the AP indicating ON state information and there being no wireless medium sensing information mapped to the address information.

The mechanism preferably includes: transmitting a Request To Send (RTS) message to the AP upon the mechanism determination information being information requiring a mechanism; transmitting a Clear To Send (CTS) message to each station in the service area upon the AP receiving an RTS message; and occupying the wireless medium by the station.

The method preferably further includes checking, by each station, whether the length of the frame is greater than a preset threshold value to occupy the wireless medium and transmitting the frame to the AP upon the length of the frame being smaller than the threshold value, and checking the mechanism determination information upon the length of the frame being greater than the threshold value.

According to still another aspect of the present invention, a Wireless Local Area Network (WLAN) including at least one station is provided, the WLAN including an Access Point (AP) adapted to store, in a state table, frame transmission state information of each station obtained by a comparison of difference time information between frame reception time information received over a wireless network and current time information to first time information, and address information of a station transmitting the frame, and to broadcast the frame transmission state information of each station stored in the state table to each station in a service area.

According to yet another aspect of the present invention, a Wireless Local Area Network (WLAN) including an Access Point (AP) is provided, the WLAN including at least one station adapted to generate frame sensing information based on difference time information between sensing time information and current time information and second time information upon a frame being sensed in a service area of an AP, and to transmit a frame to the AP through a Request To Send/Clear To Send (RTS/CTS) mechanism based on the frame sensing information and a frame transmission state of each station.

According to a further aspect of the present invention, a Wireless Local Area Network (WLAN) is provided including: an Access Point (AP) adapted to recognize frame transmission state information of each station based on a frame received from each station included in a service area, and to broadcast the frame transmission state information to each station included in a service area; and at least one station adapted to recognize wireless medium sensing information of other stations from frames sensed over a wireless network, and to recognize a station in a hidden state in the service area from the frame transmission state information received from the AP and the wireless medium sensing information.

The AP is preferably adapted to recognize frame transmission state information of each station from a result of a comparison of the frame reception time information to first time information, to parse at least one address field of the frame, and to store address information corresponding to each station and the frame transmission state information.

The AP is preferably adapted to transmit either the address information of each station or the frame transmission state information to each station either via a beacon message transmitted to to each station in a predetermined period or via an association response message corresponding to an association request message received from each station. The AP is preferably adapted to label frame transmission state information of the station having the address information as OFF state information upon the difference time information between the frame reception time information and the current time information being greater than the first time, and to label the frame transmission state information as ON state information upon the difference time information between the frame reception time information and the current time information being smaller than the first time.

Each station is preferably adapted to recognize wireless medium sensing information based on a result of a comparison of the frame sensing time information to the second time information, to parse at least one address field of the sensed frame, and to store address information corresponding to each station and the wireless medium sensing information. Each station is preferably adapted to label wireless medium sensing information of the station having the address information as hidden state information upon the difference time information between the frame sensing time information and the current time information being greater than the second time, and to label the wireless medium sensing information as sense state information upon the difference time information between the frame sensing time information and the current time information being smaller than the second time. Each station is preferably adapted to determine that a station state of the address information is the hidden state upon there being address information of a station having the frame transmission state information indicating ON state information and wireless medium sensing information indicating hidden state information. Each station is preferably adapted to determine that a station state of the address information is the hidden state upon there being no wireless medium sensing information that corresponds to address information having the frame transmission state information indicating ON state information.

According to yet a further aspect of the present invention, a method of managing a station state in a Wireless Local Area Network (WLAN) including at least one station and an Access Point (AP) is provided, the method including: recognizing, by the AP, frame transmission state information of each station based on a frame received from each station, and broadcasting the frame transmission state information to each station; recognizing, by each station, wireless medium sensing information of other stations based on sensed frames; and determining, by each station, hidden state information of each station based on the frame state information received from the AP and the wireless medium sensing information.

Recognizing the frame transmission state information preferably includes: parsing, by the AP, at least one address field of the frame; checking address information of a station transmitting the frame and frame reception time information upon Base Service Set Identification (BSS ID) information of the frame being the same as BSS ID information of the station; recognizing the frame transmission state information of a station having the address information as OFF state information upon difference time information between the frame reception time information and current time information being greater than a first time; and recognizing frame transmission state information of the station having the address information as ON state information upon the difference time information between the frame reception time information and the current time information being smaller than the first time.

Recognizing the wireless medium sensing information preferably includes: parsing, by to each station, at least one address field of the sensed frame; checking address information of the station transmitting the frame and frame sensing time information upon BSS ID information of the frame being the same as BSS ID information of service area which the station belongs to; recognizing wireless medium sensing information of a station having the address information as hidden information upon the difference time information between the frame sensing time information and the current time information being greater than a second time; and recognizing the wireless medium sensing information of the station having the address information as sense information upon the difference time information between the frame sensing time information and the current time information being smaller than the second time.

Determining hidden state information of each station preferably includes mapping the frame transmission state information to the wireless medium sensing information according to the address information of each station, and either determining the station as a hidden state upon there being the same address information having the frame transmission state information indicating ON state information and the wireless medium sensing information indicating hidden sensing information, or determining a station state of the address information as a hidden state upon there being no wireless medium sensing information that corresponds to address information having the frame transmission state information indicating ON state information.

BRIEF DESCRIPTION OF THE DRAWINGS

A more complete appreciation of the present invention and many of the attendant advantages thereof will be readily apparent as the present invention becomes better understood by reference to the following detailed description when considered in conjunction with the accompanying drawings in which like reference symbols indicate the same or similar components, wherein:

FIG. 6 is a view of the structure of a beacon message according to an exemplary embodiment of the present invention;

FIG. 11 is a flowchart illustrating a frame transmission method in a WLAN according to an exemplary embodiment of the present invention.

DETAILED DESCRIPTION OF THE INVENTION

Figure 1:
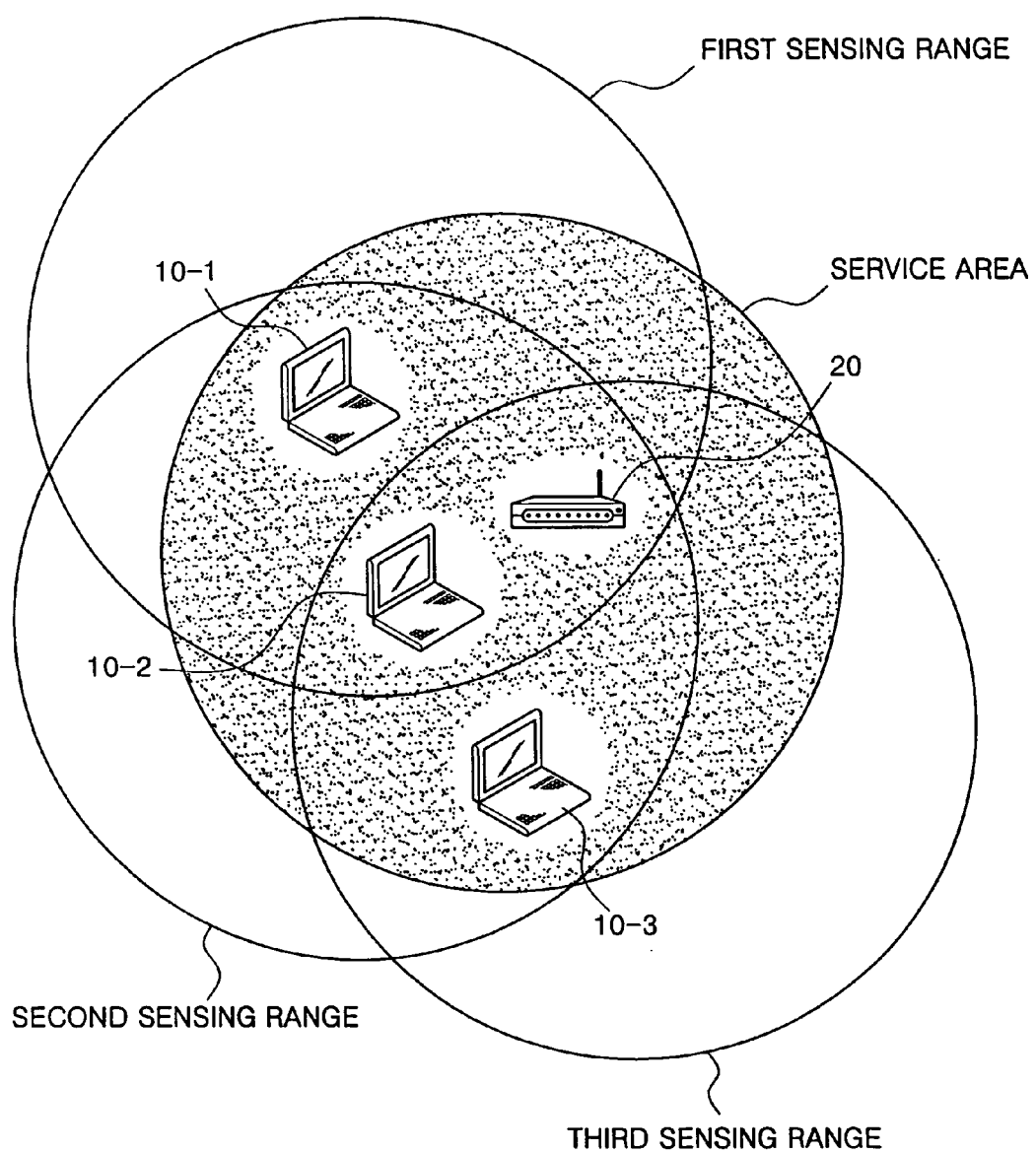
FIG. 1 is a block diagram of a WLAN.

FIG. 1 is a block diagram of a WLAN.

Referring to FIG. 1, stations 10-1, 10-2 and 10-3 are in a service area of an Access Point (AP) 20. That is, the access point 20 is in a sensing range of each station.

The second station 10-2 is in a sensing range of the first station 10-1 but the third station 10-3 is not. The first station 10-1 and the third station 10-3 are in a sensing range of the second station 10-2.

That is, the first station 10-1 can sense whether the second station 10-2 occupies a wireless medium with the AP 20, but cannot sense whether the third station 10-3 occupies the medium.

Similarly, the third station 10-3 can sense whether the second station 10-2 occupies the medium with the AP 20, but cannot sense whether the first station 10-1 occupies the medium.

Accordingly, the first station 10-1 and the third station 10-3 can simultaneously attempt to occupy the wireless medium when the second station 10-2 does not occupy the wireless medium.

A collision caused by simultaneous accesses of multiple stations to a wireless medium is called a "hidden node problem."

In order to solve the "hidden node problem," the IEEE 802.11 suggests an RTS (Request To Send)/CTS (Clear To Send) mechanism.

According to the RTS/CTS mechanism, the station 10-1, 10-2 or 10-3 is forced to exchange a short frame (e.g., RTS frame, CTS frame, etc.) with the AP 20 to block other stations from accessing the medium when the station 10-1, 10-2 or 10-3 transmits a frame longer than a set frame threshold (dot11RTSThreshold) value.

In the RTS/CTS mechanism, each station 10-1, 10-2 or 10-3 to transmit a frame longer than a threshold value first transmits an RTS frame to the AP 20 and, upon receipt of the RTS frame, the AP 20 broadcasts a CTS frame to the station 10-1, 10-2 or 10-3 in its service area.

In response to receiving the CTS frame, each station 10-1, 10-2 or 10-3 waits without occupying the wireless medium and, and the station transmitting the RTS frame occupies the wireless medium to transmit a frame.

In the RTS/CTS mechanism, the threshold value can be arbitrarily set. The RTS/CTS mechanism can or cannot be used for all frames depending on the threshold value.

The RTS/CTS mechanism can partially solve the "hidden node problem." However, when all stations 10-1, 10-2 and 10-3 transmit a frame longer than the threshold value, they are always required to process the RTS/CTS mechanism, thereby degrading use efficiency of wireless network resources and causing a frame transmission delay by an RTS/CTS mechanism performance time.

For example, it is unnecessary for a station that can sense whether each station 10-1, 10-2 or 10-3 in the service area of the AP 20 occupies the medium, like the second station 10-2 shown in FIG. 1, to perform the RTS/CTS mechanism in order to transmit a frame.

Accordingly, there is a need for a method capable of allowing each station in a WLAN to solve a "hidden node problem" through the RTS/CTS mechanism, maximizing use efficiency of a wireless network, and minimizing frame transmission delay. Hereinafter, a method and apparatus for transmitting frames in a WLAN according to an exemplary embodiment of the present invention will be described in detail with reference to the accompanying drawings.

Figure 2:
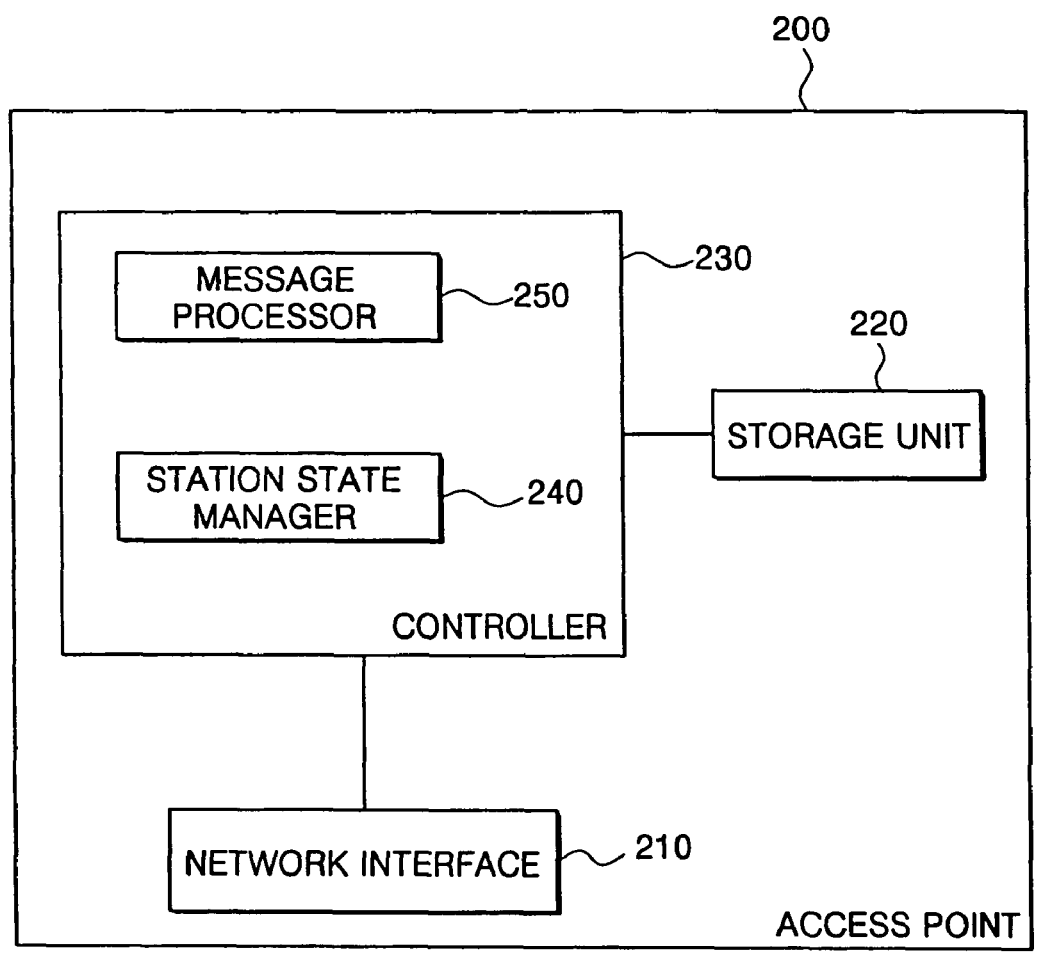
FIG. 2 is a block diagram of an AP in a WLAN according to an exemplary embodiment of the present invention.

FIG. 2 is a block diagram of an AP in a WLAN according to an exemplary embodiment of the present invention.

Referring to FIG. 2, an AP 200 includes a network interface 210, a storage unit 220, and a controller 230. The controller 230 includes a message processor 250 and a station state manager 240.

The network interface 210 can include a wireless interface (not shown) connected to each station over a wireless network, and a wired interface (not shown) connected to a server (e.g., service providing server, an authenticating server and the like) over a wired network. The network interface 210 exchanges frames with each station over a wireless medium and with a server over a wired medium.

The storage unit 220 stores operation program information of the AP 200 and a station state table for each station.

The controller 230 sends a frame received over the wireless medium to the server over the wired network, and a frame received from the server to a corresponding station over the wireless medium.

In the controller 230, the station state manager 240 parses a header of the frame received over the wireless medium to create/update a station state table for each station. That is, the station state manager 240 creates/updates the station state table using address information, reception time information and the like in the received frame.

Figure 3:
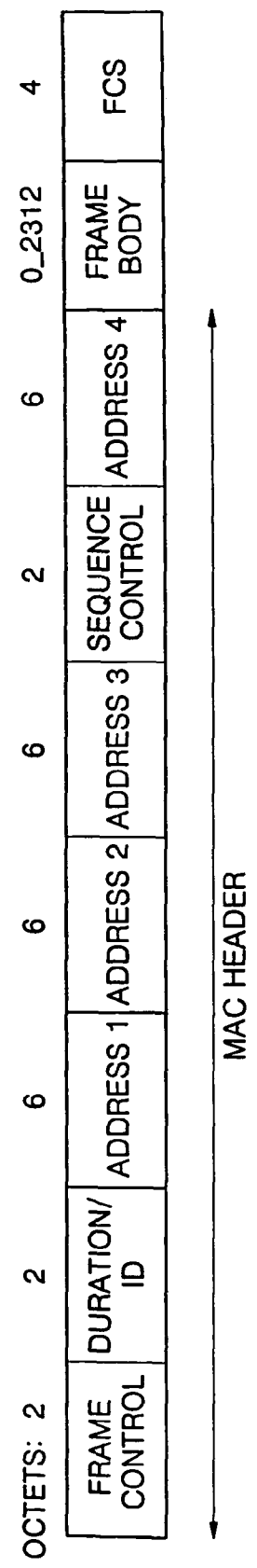
FIG. 3 is a view of a frame according to an exemplary embodiment of the present invention.

FIG. 3 is a view of a frame according to an exemplary embodiment of the present invention.

Referring to FIG. 3, a frame includes a frame control field, a duration/ID field, multiple address fields, a sequence control field, a frame body field, and a Frame Check Sequence (FCS) field.

Figure 4:
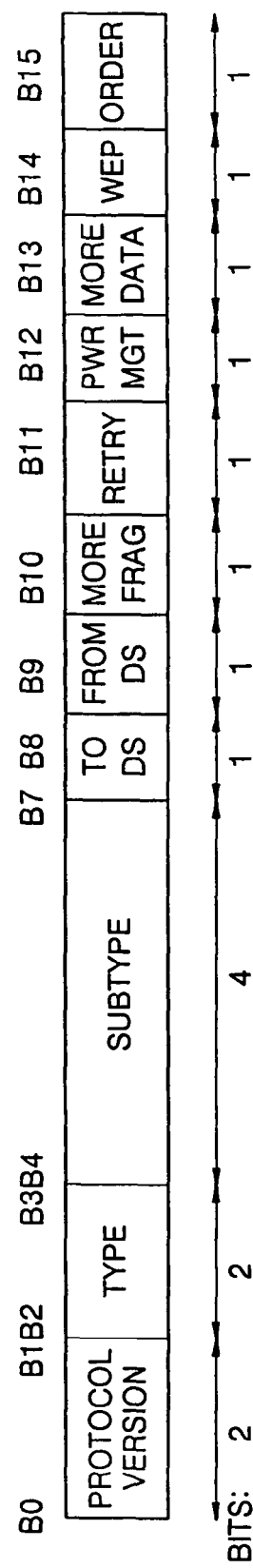
FIG. 4 is a view of a frame control field of FIG. 3.

FIG. 4 is a view of a frame control field of FIG. 3.

Referring to FIG. 4, a frame control field includes a protocol version field specifying a protocol version value, type and subtype fields indicating types of used fields, ToDS and FromDS fields indicating destinations of frames in a distributed system, a more frag field indicating frame fragmentation, a retry field specifying retransmission of frames, a Pwt Mgt field specifying a power saving mode of a station, a more data field for frame transmission to a station in a power saving mode, a Wired Equivalent Privacy (WEP) field specifying a security setting for a frame, and an order field specifying an order of frame pieces.

The address field includes destination MAC address information, source MAC address information, BSS ID information, etc.

That is, a first address field can include 48-bit MAC address information of a destination, a second address field can include 48-bit MAC address information of a source, and a third address field can include BSS ID information.

Accordingly, the controller 230 in the AP 200 retrieves a frame having the same BSS ID information contained in a header as its own BSS ID information from received frames, and creates/updates the station state table based on source MAC address information and frame reception time information in the retrieved frame.

Figure 5:
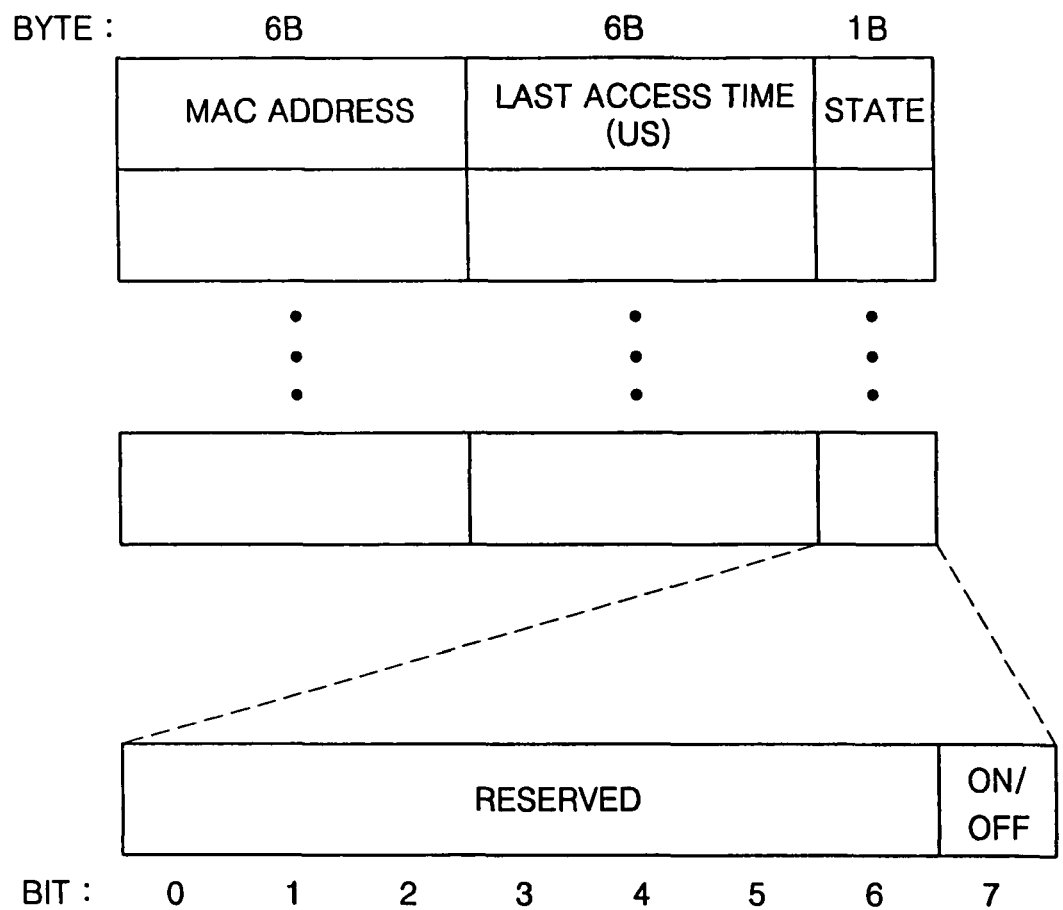
FIG. 5 is a station state table of an AP according to an exemplary embodiment of the present invention.

FIG. 5 is a station state table of an AP according to an exemplary embodiment of the present invention.

Referring to FIG. 5, the station state table includes a station MAC address field, a last access time field, and a state field. The MAC address field is 6 bytes, the last access time field is 6 bytes, and the state field is 1 bit, thereby maximizing use efficiency of a storing area of the AP 200.

That is, the controller 230 of the AP 200 retrieves a frame having the same BSS ID information in an address field of a header as its own BSS ID information from the received frames.

The controller 230 includes source MAC address information and frame reception time information of the frame having the same BSS ID information in the MAC address field and the last access time field of the station state table, respectively, to create a station state table.

If the same MAC address information as source MAC address information of a frame received after creating the station state table exists in the station state table, the controller 230 updates the last access time field corresponding to the MAC address information with the frame reception time information.

On the other hand, if the same MAC address information as the source MAC address information of the received frame does not exist in the station state table, the controller 230 adds a MAC address field having information about frame transmitting MAC address and a last access time field having information about frame reception time to blank fields of the created station state table.

The controller 230 determines state information of the station based on the current time information T1 and frame reception time information T2 contained in the last access time field, and includes the state information in the state field.

That is, the controller 230 determines that a station having the MAC address is switched to a power save mode or a power off mode when a difference between the current time information T1 and the frame reception time information T2 becomes greater than a predetermined set time Ton, and then labels the station state information as an OFF state.

The controller 230 also determines that the AP 200 recently receives a frame from the station when the difference between the current time information T1 and the frame reception time information T2 is smaller than the predetermined set time Ton, and then labels the station state information as an ON state. The state information of each station can be set as one bit. For example, bit 0 indicates the OFF state and bit 1 indicates the ON state.

The predetermined time Ton used to determine the station state information can be arbitrarily set depending on states of a wireless network by a manager of the WLAN. To update the state information, the AP 200 determines the station state information based on the frame reception time information of the station state table and the predetermined time Ton in a predetermined period.

The controller 230 of the AP 200 sends the information in the station state table to each station in the service area in a predetermined period.

That is, the message processor 250 of the controller 230 sends the MAC address information and the state information in the station state table to each station in a predetermined period.

In this case, the message processor 250 can send the MAC address information and the state information on a periodically transmitted beacon message.

FIG. 6 is a view of the structure of a beacon message according to an exemplary embodiment of the present invention.

Referring to FIG. 6, a beacon message sent by the AP 200 can include station state information in its variable frame body.

The beacon message includes timestamp information, beacon interval information, capability information, service set ID information, supported rate information, FH parameter information, DS parameter information, CF parameter information, MSS parameter information, Traffic Indication Map (TIM) information, and information about a station state table that is created based on a received frame by the AP 200.

Figure 7:
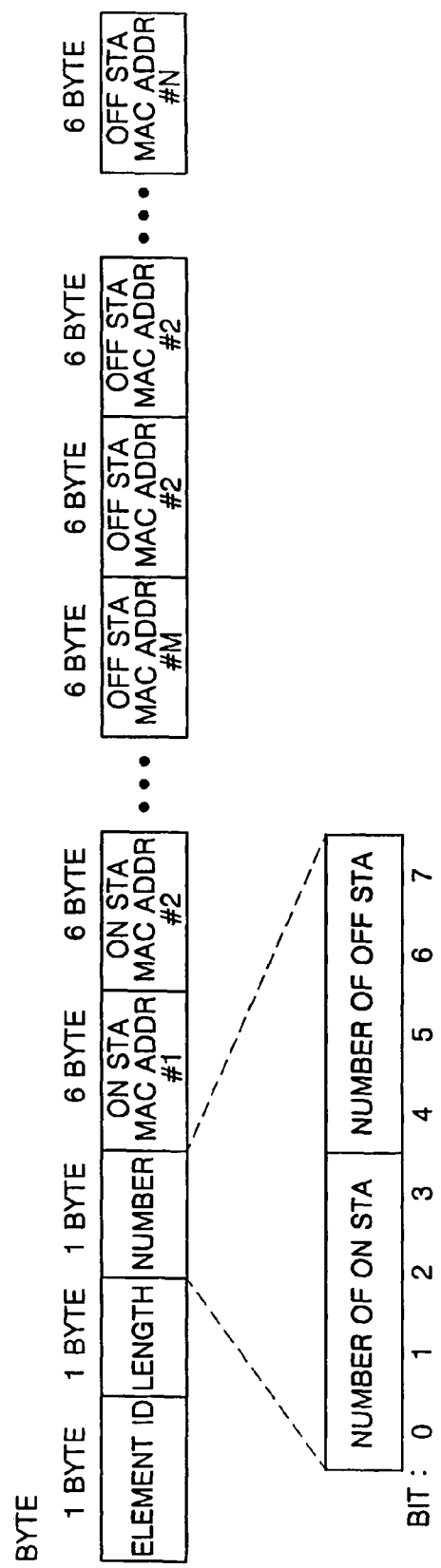
FIG. 7 is a view of the structure of a message carrying station state table information according to an exemplary embodiment of the present invention.

FIG. 7 is a view of the structure of a message carrying station state table information according to an exemplary embodiment of the present invention.

Referring to FIG. 7, the structure includes an element ID field specifying information for the station state table, a length field specifying length information, an ON state number (Number of ON STA) field specifying the number of MAC addresses at an ON state, an OFF state number (Number of OFF STA) field specifying the number of MAC addresses at an OFF state, and at least one address (MAC adr) field sequentially including MAC address information at the ON state and MAC address information at the OFF state.

That is, the message processor 250 of the AP 200 includes MAC address information of the station state table and the ON or OFF state information for the MAC address information in a periodically generated beacon message and sends the beacon message to each station in the service area.

Figure 8:
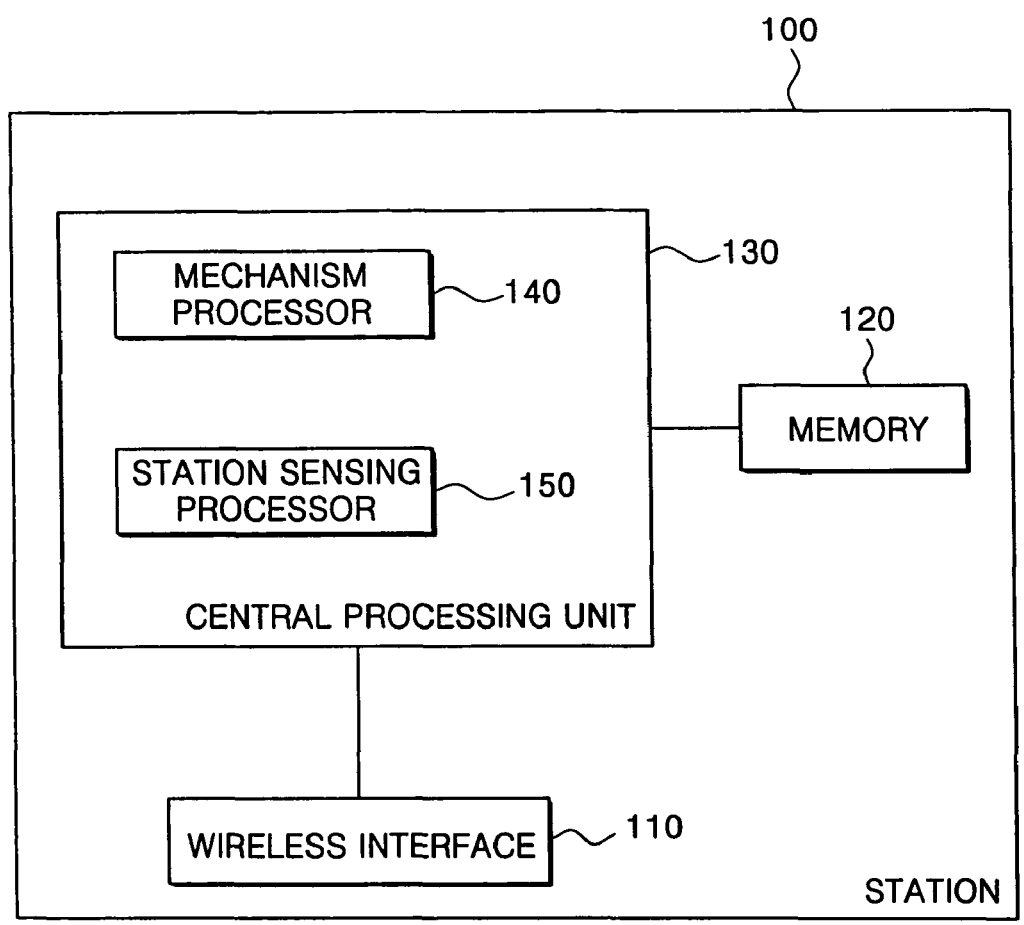
FIG. 8 is a block diagram of a station according to an exemplary embodiment of the present invention.

FIG. 8 is a block diagram of a station according to an exemplary embodiment of the present invention.

Referring to FIG. 8, the station 100 includes a wireless interface 110, a central processing unit 130, and a memory 120. The central processing unit 130 includes a station sensing processor 150 and a mechanism processor 140.

The wireless interface 110 transmits or receives a frame to or from the AP 200 over the wireless medium.

The memory 120 stores a station sensing table including operation program information of the station 100 or sensing information of at least one further station 100 obtained by sensing the wireless medium.

The central processing unit 130 provides WLAN service based on frames transmitted/received via the AP 200, and parses a header of the frame received over the wireless medium to create/update a station sensing table.

The central processing unit 130 creates a mechanism table based on the station sensing table and the state information in the station state table received from the AP 200, and consults the mechanism table to determine whether to transmit a frame using an RTS/CTS mechanism.

That is, the station sensing processor 150 of the central processing unit 130 recognizes the source MAC address information and the BSS ID information from address fields of the frame having the structure as shown in FIG. 3.

In addition, the station sensing processor 150 retrieves a frame having the same BSS ID information as its own BSS ID information, creates a station sensing table using source MAC address information and frame sensing time information in the frame having the same BSS ID information, and stores the created station sensing table in the memory 120.

Since a frame can be received from a station 100 included in a service area of an AP 200 that is different depending on the position of the station 100, the station sensing processor 150 retrieves a frame having the same BSS ID information as its own BSS ID information from the received frames and, if the BSS ID information is not the same, discards it.

Figure 9:
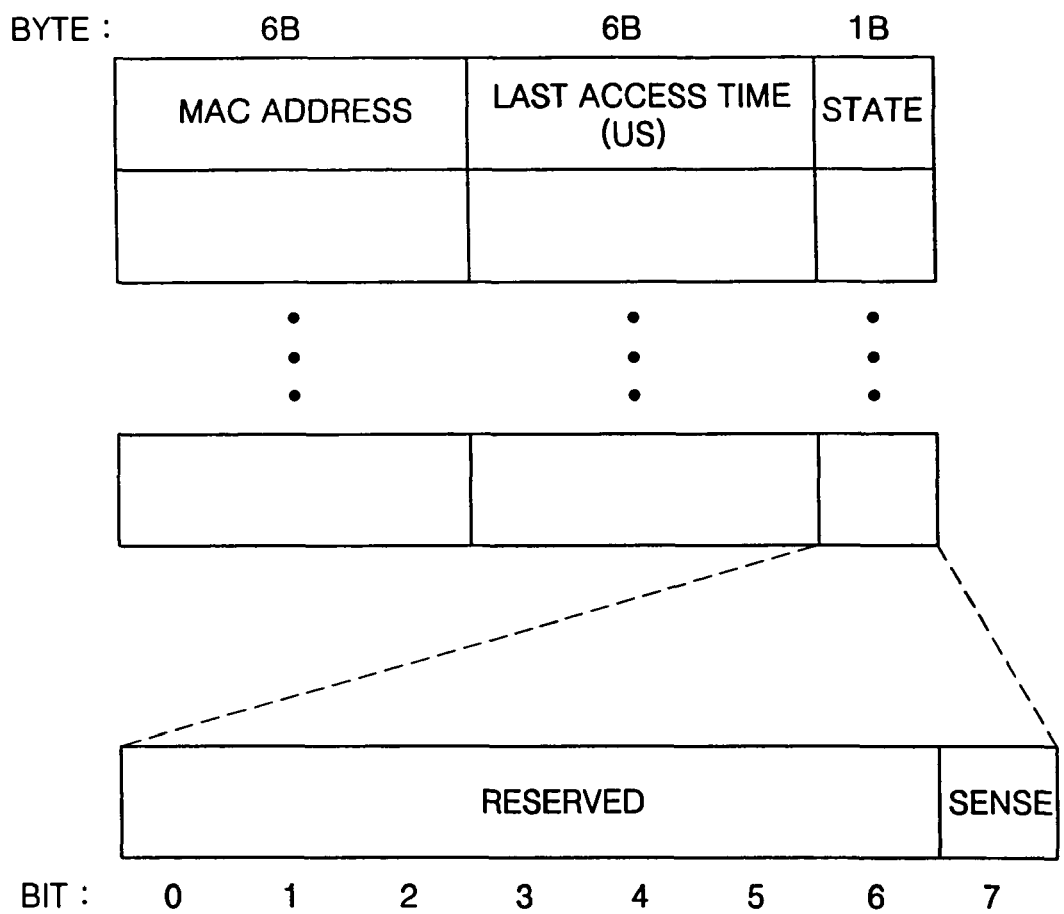
FIG. 9 is a station sensing table of a station according to an exemplary embodiment of the present invention.

FIG. 9 is a station sensing table of a station according to an exemplary embodiment of the present invention.

Referring to FIG. 9, the station sensing table has a similar structure to the station state table of FIG. 5. The station sensing table includes a station MAC address field, a last access time field, and a state field.

The MAC address field is 6 bytes, the last access time field is 6 bytes, and the state field is 1 bit, thereby maximizing use efficiency of a storing area of the AP 200 station 100.

That is, the central processing unit 130 of the station 100 retrieves a frame having the same BSS ID information in an address field of a header as its own BSS ID information from the received frames.

The central processing unit 130 includes source MAC address information and frame sensing time information of the field having the same BSS ID information in the MAC address field and the last access time field, respectively, to create a station sensing table.

If the same MAC address information as source MAC address information of a frame sensed after creating the station sensing table exists in the station sensing table, the central processing unit 130 updates the last sensing time field corresponding to the MAC address information with the frame sensing time information.

On the other hand, if the same MAC address information as the source MAC address information of the sensed frame does not exist in the station sensing table, the central processing unit 130 adds a MAC address field having information about a source MAC address of the frame and a last access time field having information about frame sensing time to blank fields of the created station sensing table.

The central processing unit 130 determines sensing information of the station 100 based on the current time information T10 and the frame sensing time information T20 contained in the last sensing time field, and includes the sensing information in the state field.

That is, the central processing unit 130 determines that a station 100 having the MAC address is switched to a hidden state when a difference between the current time information T10 and the frame sensing time information T20 becomes greater than a predetermined set time Tse, and then labels the station sensing information as the hidden state.

When a difference between the current time information T10 and the frame sensing time information T20 is smaller than the predetermined set time Tse, the central processing unit 130 labels the sensing information of the station 100 as a sense state since the central processing unit 130 recently senses a frame from the station 100.

The predetermined time Tse used to determine the station sensing information can be arbitrarily set depending on states of a wireless network by a manager of the WLAN. To update the sensing information, the AP 200 determines the station sensing information based on the frame sensing time information of the station sensing table and the predetermined time Tse in a predetermined period.

The station 100 compares the station state table received from the AP 200 to the created station sensing table to create a mechanism table.

That is, the station sensing processor 150 of the central processing unit 130 forms a station state table as shown in FIG. 7 based on MAC address information and state information received through the beacon message from the AP 200, and compares the station state table to the station sensing table stored in the memory 120 to create a mechanism table.

Figure 10:
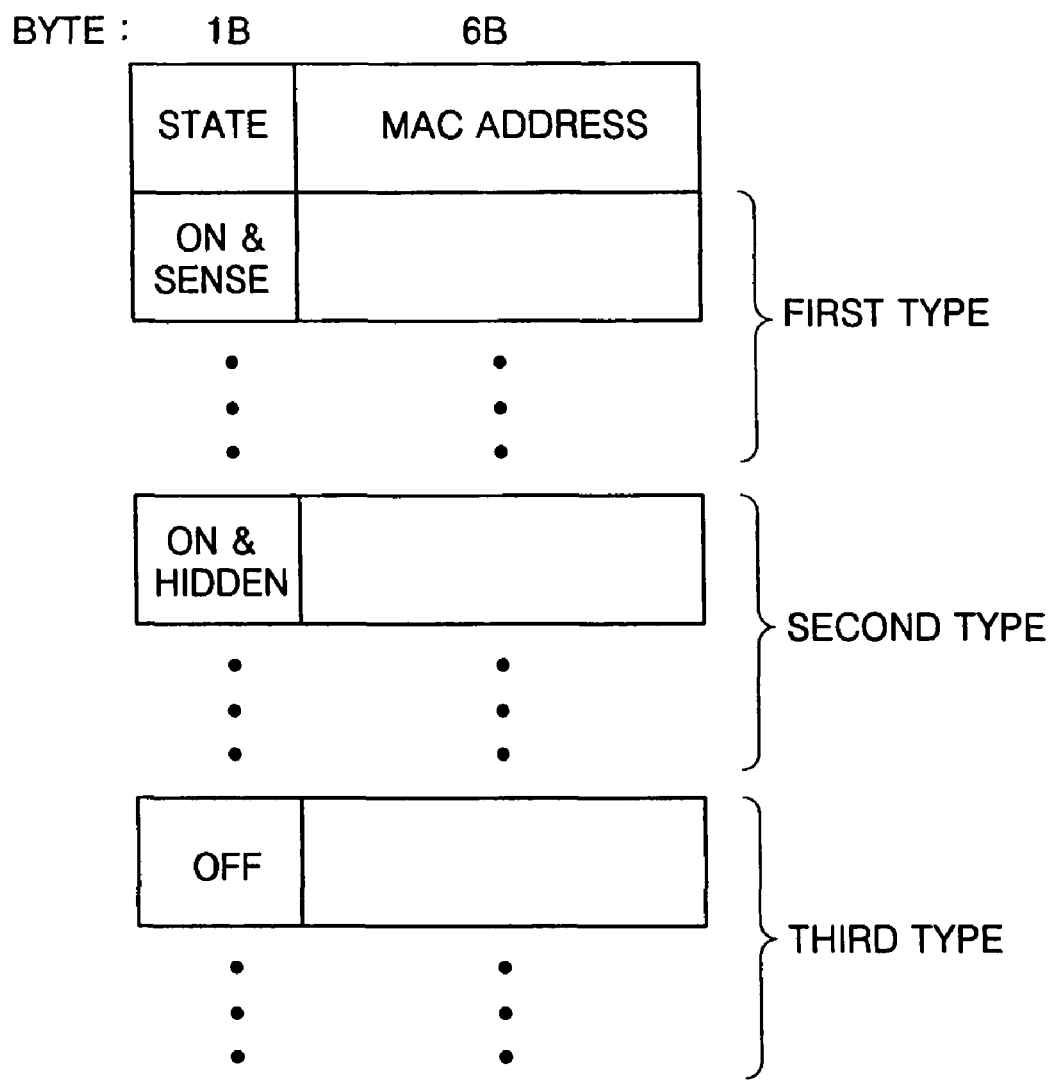
FIG. 10 is a mechanism table according to an exemplary embodiment of the present invention.

FIG. 10 is a mechanism table according to an exemplary embodiment of the present invention.

Referring to FIG. 10, the station 100 maps the MAC address information and the sensing information included in the station sensing table to the MAC address information and the state information of the station state table received from the AP 200 to create a mechanism table.

In creating the mechanism table, the station 100 classifies the MAC address information into a first type station 100 MAC address information having state information indicating an ON state and a sense state, a second type station 100 MAC address information having state information indicating an ON state and a hidden state, and a third type station 100 MAC address information having state information indicating an OFF state.

That is, when the same MAC address information is included in both the station state table and the station sensing table, the station 100 identifies the type of the station 100 based on the state information and sensing information corresponding to the MAC address information to create the mechanism table.

The station sensing processor 150 then compares the MAC address information indicating the ON state received sequentially through the beacon message to the MAC address information included in the station sensing table. If the same MAC address information in the table indicates the sense state, the station sensing processor 150 determines that the station is the first type station 100 and if it indicates a hidden state, the station sensing processor 150 determines that the station is the second type station 100.

On the other hand, if the same MAC address information as the received MAC address information is not included in the station sensing table, the station sensing processor 150 determines that a station 100 having the MAC address information is the second type station 100.

That is, if the same MAC address information as the MAC address information in the station state table received from the AP 200 is not included in the station sensing table, the station sensing processor 150 determines that the station 100 having the MAC address information is in a hidden state.

If the state information of the received MAC address information indicates the ON state, the station sensing processor 150 determines that the station is the second type station 100, and if it is at the OFF state, the station sensing processor 150 determines that the station is the third type station 100.

Upon receipt of the MAC address information indicating the OFF state, the station sensing processor 150 determines that the station 100 terminates communication using the wireless medium as in the power off mode, don't care, and determines that the station is the third type station 100.

Preferably, the station sensing processor 150 updates the MAC address information and the sensing information of the station sensing table each time it receives a frame over the wireless medium, and updates the mechanism table with the MAC address information and state information of the periodically received station state table.

When the station 100 has a frame to transmit over the wireless medium, that is, the station 100 has to transmit a frame greater than a set threshold value, the mechanism processor 140 sends an RTS message to the AP 200 if the second type station 100 MAC address information having state information indicating an ON state and a hidden state is included in the mechanism table. That is, the mechanism processor 140 sends a frame through an RTS/CTS mechanism when there is the second type station 100 MAC address information.

On the other hand, if there is no second type station 100 MAC address information, the mechanism processor 140 occupies the wireless medium to transmit a frame. That is, when other stations 100 are in the OFF state or in sensible state, the mechanism processor 140 checks whether there is a station occupying the wireless medium, and occupies a wireless medium to transmit a frame when the wireless medium is not occupied.

When the station 100 initially connects to the AP 200 and transmits an authenticating request message to an authenticating server (not shown) via the AP 200, the authenticating server performs an authenticating procedure on the station 100 to transmit the authenticating response message to the station 100 via the AP 200.

If the authenticating procedure is completed, the station 100 transmits a connection association request message to an AP 200 and the AP 200 transmits an association response message to the station 100 terminating an authenticating procedure. The AP 200 includes the MAC address information and the state information of the station state table in a variable frame body of the association response message and then transmits the association response message.

The station 100 retrieves a frame having the same BSS ID information included in the address field of the header as its own BSS ID information from the sensed frames to create a station sensing table.

If the same MAC address information is included in the station state table and the station sensing table, the station 100 identifies the type of the station 100 to create the mechanism table based on the state information and the sensing information corresponding to the MAC address information, thereby minimizing a mechanism table creating time.

FIG. 11 is a flowchart of a frame transmission method in a WLAN according to an exemplary embodiment of the present invention.

Referring to FIG. 11, an AP 200 of a WLAN parses a header of a received frame to create a station state table containing MAC address information and state information of each station 100 within a service area (S10).

The AP 200 includes source MAC address information of a frame containing the same BSS ID information as its own BSS ID information and frame reception time information in the MAC address field and the last access time field of the station state table, respectively, to create the station state table. The AP 200 determines ON or OFF state information of the station 100 based on the current time information T1 and frame reception time information T2 included in the last access time field, and includes the state information in the state field.

The AP 200 updates the information contained in the MAC address field and the last access time field and the state field of the station state table with the current time information T1 and frame reception time information T2 upon receiving a frame or periodically.

Each station 100 parses a header of a sensed frame to create a station sensing table, which contains MAC address information and sensing information of the station 100 transmitting the sensed frame (S20).

The station 100 retrieves a frame having the same BSS ID information as its own BSS ID information from the sensed frames, creates a station sensing table based on source MAC address information and frame-sensed time information, determines hidden or sense information of the station 100 based on the current time information T10 and the frame sensing time information T20 contained in the last sensed time field, and includes the hidden or sense information in the state field.

The station 100 updates the information contained in the MAC address field, and the last access time field and the state field of the station sensing table with the current time information T10 and frame reception time information T20 upon receiving a frame or periodically.

The AP 200 includes the created station state table in the periodically transmitted message, e.g., the beacon message and transmits it to each station 100 (S30).

When the station 100 initially connects to the AP 200, the AP 200 includes the station state table in an association response message that is a response message to an association request message received from the station 100, and transmits the association response message to the station 100.

The station 100 compares the station state table received from the AP 200 to the created station sensing table to create a mechanism table (S40).

That is, the station 100 creates a mechanism table as shown in FIG. 10, based on the MAC address information and the state information included in the station state table and the MAC address information and the sensing information included in the station sensing table.

If the same MAC address information is contained in the station state table and the station sensing table, the station 100 discriminates the type of the station 100 based on the state information and sensing information corresponding to the MAC address information to create the mechanism table.

In creating the mechanism table, the station 100 classifies the MAC address information into a first type station 100 MAC address information having state information indicating an ON state and a sense state, a second type station 100 MAC address information having state information indicating an ON state and a hidden state, and a third type station 100 MAC address information having state information indicating an OFF state.

The station 100 compares the received MAC address information indicating the ON state to the MAC address information included in the station sensing table, and determines that the station is the first type station 100 when the same retrieved MAC address information indicates a sense state and determines that the station is the second type station 100 when it indicates hidden state.

Furthermore, when the same MAC address information as the received MAC address information is included in the station sensing table, the station 100 determines that the station 100 having the MAC address information is the second type station 100.

Upon receipt of the MAC address information indicating the OFF state, the station sensing processor 150 determines that the station 100 terminates communication using the wireless medium as in the power off mode and determines that the station is the third type station 100 that can be treated as Don't Care.

The station 100 updates the mechanism table when the MAC address information or state information of the periodically received station state table is changed or the MAC address information and sensing information of station sensing table is changed.

If there is a frame to be transmitted to the AP 200, the station 100 determines weather the frame is greater than the preset threshold value (S50).

When the frame is smaller than the preset threshold value, the station 100 occupies the wireless medium to transmit the frame when other stations 100 do not occupy wireless medium (S 60).

On the other hand, if the frame is greater than the preset threshold value, the station 100 determines whether the second type station 100 MAC address information having state information indicating the ON state and the hidden state is in the mechanism table, i.e., whether there is a station 100 in a hidden state (S 70).

When there is no second type station 100 MAC address information, the station 100 occupies the wireless medium to transmit the frame when other stations 100 do not occupy the wireless medium (S 60).

On the other hand, when there is the second type station 100 MAC address information, the station 100 forcibly blocks other stations 100 from accessing the wireless medium through the RTS/CTS mechanism and then transmits a frame over the wireless medium (S 80).

That is, the station 100 transmits its own RTS message to the AP 200, and when the AP receives the RTS message, the AP broadcasts the CTS message to respective stations in the service area.

When other stations 100 excluding the station 100 transmitting the RTS message receive the CTS message, they do not attempt to occupy the wireless medium but wait, and the station 100 transmitting the RTS message occupies the wireless medium to transmit the frame.

In the WLAN, the AP 200 transmits the station state table through a beacon message that is periodically transmitted to the station 100 and an association response message when the station 100 initially attempts to connect, the present invention is equally applicable to the case of transmitting the station state table through the hand off process of the station 100 or a re-association process in which a station temporarily deviates from the service area of the AP 200 and returns to the service area.

As described above, according to the present invention, it is possible to improve use efficiency of wireless resources by each station in a service area of an AP checking whether there is a station in a hidden state and, only when there is a station in a hidden state, performing an RTS CTS mechanism to remove an RTS/CTS frame that can be unnecessarily exchanged.

It is also possible for each station to minimize frame transmission delay by occupying a wireless medium and then transmitting a frame without performing the RTS/CTS mechanism when there is no station in a hidden state.

While the present invention has been described with reference to exemplary embodiments thereof, it will be understood by those skilled in the art that various modifications in form and detail can be made therein without departing from the scope of the present invention as defined by the following claims.

What is claimed is:

1. A Wireless Local Area Network (WLAN) comprising:
at least one station; and
an Access Point (AP) configured to recognize frame transmission state information of a station based on a frame received from the station and to broadcast the frame transmission state information to each station,
wherein the at least one station is configured to recognize wireless medium sensing information of other stations from frames sensed over a wireless network, to generate mechanism determination information based on the frame transmission state information received from the AP and the wireless medium sensing information, and to perform a mechanism based on the mechanism determination information before transmitting a frame to the AP or to directly occupy the wireless medium to transmit the frame to the AP without performing the mechanism upon there being a frame to be transmitted to the AP,
wherein the AP comprises:
a state manager configured to create a state table, the state table comprising frame transmission state information of each station obtained by comparing frame reception time information to a first time, and address information; and
a message processor configured to broadcast the frame transmission state information and the address information of each station included in the state table to each station.

2. The WLAN according to claim 1, wherein the state manager is configured to parse at least one address field of the received frame, and to store the address information and the frame transmission state information corresponding to each station in the state table upon Base Service Set Identification (BSS ID) information being the same as BSS ID information of the AP.

3. The WLAN according to claim 1, wherein the state manager is configured to either update or add the address information and the frame transmission state information included in the state table upon receipt of the received frame.

4. The WLAN according to claim 1, wherein the message processor is configured to transmit to each station either the address information of each station or the frame transmission state information via a beacon message transmitted to each station in a predetermined period or via an association response message corresponding to an association request message received from each station.

5. The WLAN according to claim 1, wherein the state manager is configured to label frame transmission state information of a station having the address information as OFF state information upon a difference time information between the frame reception time information and current time information being greater than the first time, and to label the frame transmission state information as ON state information upon the difference time information being smaller than the first time.

6. The WLAN according to claim 1, wherein each station comprises:
   a sensing manager configured to create a sensing table, the sensing table comprising both wireless medium sensing information obtained by comparing frame sensing time information to a second time, and address information;
   a mechanism manager configured to map the sensing information to the state information received from the AP to generate mechanism determination information of each station; and
   a mechanism processor configured to perform the mechanism according to the mechanism determination information or to directly occupy the wireless medium to transmit the frame to the AP.

7. The WLAN according to claim 6, wherein the sensing manager is configured to parse at least one address field of the sensed frame, and to store address information and wireless medium sensing information corresponding to each station in the state table upon BSS ID information being the same as BSS ID information of the station.

8. The WLAN according to claim 6, wherein the sensing manager is configured to either update or add the address information and the wireless medium sensing information included in the sensing table upon receipt of the sensed frame.

9. The WLAN according to claim 6, wherein the sensing manager is configured to label the wireless medium sensing information of a station having the address information as hidden state information upon a difference time information between the frame sensing time information and current time information being greater than the second time, and to label the wireless medium sensing information as sense state information upon the difference time information being smaller than the second time.

10. The WLAN according to claim 6, wherein the mechanism manager is configured to label mechanism determination information as information requiring the mechanism upon there being address information of a station having the frame transmission state information indicating ON state information and the wireless medium sensing information indicating hidden state information, and to label the mechanism determination information as information requiring no mechanism upon there being no address information of a station having the frame transmission state information indicating ON state information and the wireless medium sensing information indicating hidden state information.

11. The WLAN according to claim 6, wherein the mechanism manager is configured to label the mechanism determination information as information requiring the mechanism upon the same address information as the address information of the station having the frame transmission state information indicating the ON state information not being included in the sensing table.

12. The WLAN according to claim 6, wherein the mechanism processor is configured to perform a Request To Send/Clear To Send (RTS/CTS) mechanism to transmit the frame to the AP upon the mechanism determination information being information requiring the mechanism, and to occupy the wireless medium to transmit the frame to the AP upon the mechanism determination information being information requiring no mechanism.

13. The WLAN according to claim 6, wherein the mechanism processor is configured to occupy the wireless medium to transmit the frame to the AP upon the length of the frame being smaller than a preset threshold value, and to check the mechanism determination information upon the length of the frame being greater than the preset threshold value.

14. A frame transmission method in a Wireless Local Area Network (WLAN) comprising at least one station and an Access Point (AP), the method comprising:
   recognizing, by the AP, frame transmission state information of a station based on a frame received from a station and broadcasting the frame transmission state information and address information to each station;
   recognizing, by each station, wireless medium sensing information and address information of other stations from sensed frames;
   generating, by each station, mechanism determination information based on the frame transmission state information received from the AP and the wireless medium sensing information; and
   checking, by each station, the mechanism determination information to either transmit a frame to the AP through a mechanism or to occupy the wireless medium and transmit the frame to the AP without the mechanism upon there being a frame to be transmitted to the AP,
   wherein recognizing the frame transmission state information comprises:
      parsing, by the AP, at least one address field of the received frame;
      checking address information of the station transmitting the received frame and frame reception time information upon Base Service Set Identification (BSS ID) information of the received frame being the same as BSS ID information of each station; and
      labeling the frame transmission state information corresponding to each station based on a result of a comparison of a difference time information between the reception time information and the current time information to a first time.

15. The method according to claim 14, wherein labeling the frame transmission state information comprises:
   labeling frame transmission state information of a station having the address information as OFF state information upon the difference time information between the frame reception time information and the current time information being greater the first time; and
   labeling the frame transmission state information of the station having the address information as ON state information upon the difference time information between the frame reception time information and the current time information being smaller than the first time.

16. A frame transmission method in a Wireless Local Area Network (WLAN) comprising at least one station and an Access Point (AP), the method comprising:
   recognizing, by the AP, frame transmission state information of a station based on a frame received from a station and broadcasting the frame transmission state information and address information to each station;

recognizing, by each station, wireless medium sensing information and address information of other stations from sensed frames;

generating, by each station, mechanism determination information based on the frame transmission state information received from the AP and the wireless medium sensing information; and checking, by each station, the mechanism determination information to either transmit a frame to the AP through a mechanism or to occupy the wireless medium and transmit the frame to the AP without the mechanism upon there being a frame to be transmitted to the AP, wherein recognizing the wireless medium sensing information comprises:

parsing, by each station, at least one address field of the sensed frame;

checking address information of the station transmitting the sensed frame and frame sensing time information upon BSS ID information of the frame being the same as BSS ID information of a service area of the station; and labeling the wireless medium sensing information corresponding to each station based on a result of comparison of a difference time information between the frame sensing time information and the current time information to a second time.

17. The method according to claim 16, wherein labeling the wireless medium sensing information comprises:

labeling the wireless medium sensing information of the station having the address information as hidden information upon the difference time information between the frame sensing time information and the current time information being greater than the second time; and labeling the wireless medium sensing information of the station having the address information as sense information upon the difference time information between the frame sensing time information and the current time information being smaller than the second time.

18. A frame transmission method in a Wireless Local Area Network (WLAN) comprising at least one station and an Access Point (AP), the method comprising:

recognizing, by the AP, frame transmission state information of a station based on a frame received from a station and broadcasting the frame transmission state information and address information to each station;

recognizing, by each station, wireless medium sensing information and address information of other stations from sensed frames;

generating, by each station, mechanism determination information based on the frame transmission state information received from the AP and the wireless medium sensing information; and checking, by each station, the mechanism determination information to either transmit a frame to the AP through a mechanism or to occupy the wireless medium and transmit the frame to the AP without the mechanism upon there being a frame to be transmitted to the AP, wherein generating the mechanism determination information comprises mapping the frame transmission state information to the wireless medium sensing information according to the address information of each station to generate information requiring the mechanism upon there being the same address information having state information indicating ON state information and the wireless medium sensing information indicating hidden sensing information, and to generate information requiring no mechanism upon there being no same address information having state information indicating ON state information and the wireless medium sensing information indicating hidden sensing information.

19. The method according to claim 18, further comprising generating information requiring the mechanism upon the frame transmission state information of the address information received from the AP indicating ON state information and there being no wireless medium sensing information mapped to the address information.

20. The method according to claim 14, wherein the mechanism comprises:

transmitting a Request To Send (RTS) message to the AP upon the mechanism determination information being information requiring the mechanism;

transmitting a Clear To Send (CTS) message to each station in the service area upon the AP receiving the RTS message; and occupying the wireless medium by the station.

21. The method according to claim 14, further comprising checking, by each station, whether the length of the frame is greater than a preset threshold value to occupy the wireless medium and transmitting the frame to the AP upon the length of the frame being smaller than the threshold value, and checking the mechanism determination information upon the length of the frame being greater than the threshold value.

22. A Wireless Local Area Network (WLAN) comprising:

an Access Point (AP) configured to recognize frame transmission state information of each station based on a frame received from each station included in a service area, and to broadcast the frame transmission state information to each station included in the service area; and at least one station configured to recognize wireless medium sensing information of other stations from frames sensed over a wireless network, and to determine a station in a hidden state in the service area from the frame transmission state information received from the AP and the wireless medium sensing information, wherein the at least one station is configured to transmit a frame to the AP through a Request To Send/Clear To Send (RTS/CTS) mechanism only if the at least one station determines a station in the hidden state exists in the service area, wherein the AP is configured to recognize frame transmission state information of each station from a result of a comparison of a frame reception time information to a first time, to parse at least one address field of the received frame, and to store address information corresponding to each station and the frame transmission state information, wherein the AP is configured to label frame transmission state information of the station having the address information as OFF state information upon a difference time information between the frame reception time information and a current time information being greater than the first time, and to label the frame transmission state information as ON state information upon the difference time information between the frame reception time information and the current time information being smaller than the first time.

23. The WLAN according to claim 22, wherein the AP is configured to transmit either the address information of each station or the frame transmission state information to each station either via a beacon message transmitted to each station in a predetermined period or via an association response message corresponding to an association request message received from each station.

24. A Wireless Local Area Network (WLAN) comprising:
an Access Point (AP) configured to recognize frame transmission state information of each station based on a frame received from each station included in a service area, and to broadcast the frame transmission state information to each station included in the service area; and
at least one station configured to recognize wireless medium sensing information of other stations from frames sensed over a wireless network, and to determine a station in a hidden state in the service area from the frame transmission state information received from the AP and the wireless medium sensing information,
wherein the at least one station is configured to transmit a frame to the AP through a Request To Send/Clear To Send (RTS/CTS) mechanism only if the at least one station determines a station in the hidden state exists in the service area,
wherein each station is configured to recognize wireless medium sensing information based on a result of a comparison of a frame sensing time information to a second time, to parse at least one address field of the sensed frame, and to store address information corresponding to each station and the wireless medium sensing information.

25. The WLAN according to claim 24, wherein each station is configured to label wireless medium sensing information of the station having the address information as hidden state information upon a difference time information between the frame sensing time information and a current time information being greater than the second time, and to label the wireless medium sensing information as sense state information upon the difference time information between the frame sensing time information and the current time information being smaller than the second time.

26. A Wireless Local Area Network (WLAN) comprising:
an Access Point (AP) configured to recognize frame transmission state information of each station based on a frame received from each station included in a service area, and to broadcast the frame transmission state information to each station included in the service area; and
at least one station configured to recognize wireless medium sensing information of other stations from frames sensed over a wireless network, and to determine a station in a hidden state in the service area from the frame transmission state information received from the AP and the wireless medium sensing information,
wherein the at least one station is configured to transmit a frame to the AP through a Request To Send/Clear To Send (RTS/CTS) mechanism only if the at least one station determines a station in the hidden state exists in the service area,
wherein each station is configured to determine that a station state of the address information is the hidden state upon there being address information of a station having the frame transmission state information indicating ON state information and wireless medium sensing information indicating hidden state information.

27. A Wireless Local Area Network (WLAN) comprising:
an Access Point (AP) configured to recognize frame transmission state information of each station based on a frame received from each station included in a service area, and to broadcast the frame transmission state information to each station included in the service area; and
at least one station configured to recognize wireless medium sensing information of other stations from frames sensed over a wireless network, and to determine a station in a hidden state in the service area from the frame transmission state information received from the AP and the wireless medium sensing information,
wherein the at least one station is configured to transmit a frame to the AP through a Request To Send/Clear To Send (RTS/CTS) mechanism only if the at least one station determines a station in the hidden state exists in the service area,
wherein each station is configured to determine that a station state of the address information is not the hidden state upon there being no wireless medium sensing information indicating hidden state information that corresponds to address information having the frame transmission state information indicating ON state information.

28. A method of managing a station state in a Wireless Local Area Network (WLAN) comprising at least one station and an Access Point (AP), the method comprising:
recognizing, by the AP, frame transmission state information of each station based on a frame received from each station, and broadcasting the frame transmission state information to each station;
recognizing, by each station, wireless medium sensing information of other stations based on sensed frames; and
determining, by each station, hidden state information of each station based on the frame state information received from the AP and the wireless medium sensing information,
wherein the at least one station is configured to transmit a frame to the AP through a Request To Send/Clear To Send (RTS/CTS) mechanism only if the at least station determines a station in the hidden state exists in the service area,
wherein recognizing the frame transmission state information comprises:
parsing, by the AP, at least one address field of the received frame;
checking address information of a station transmitting the received frame and frame reception time information upon Base Service Set Identification (BSS ID) information of the received frame being the same as BSS ID information of the AP;
recognizing the frame transmission state information of a station having the address information as OFF state information upon a difference time information between a frame reception time information and a current time information being greater than a first time; and
recognizing the frame transmission state information of the station having the address information as ON state information upon the difference time information between the frame reception time information and the current time information being smaller than the first time.

29. A method of managing a station state in a Wireless Local Area Network (WLAN) comprising at least one station and an Access Point (AP), the method comprising:
recognizing, by the AP, frame transmission state information of each station based on a frame received from each station, and broadcasting the frame transmission state information to each station;
recognizing, by each station, wireless medium sensing information of other stations based on sensed frames; and determining, by each station, hidden state information of each station based on the frame state information received from the AP and the wireless medium sensing information, wherein the at least one station is configured to transmit a frame to the AP through a Request To Send/Clear To Send (RTS/CTS) mechanism only if the at least station determines a station in the hidden state exists in the service area, wherein recognizing the wireless medium sensing information comprises:

parsing, by each station, at least one address field of the sensed frame;

checking address information of the station transmitting the sensed frame and frame sensing time information upon BSS ID information of the frame being the same as BSS ID information of a service area which the station belongs to;

recognizing wireless medium sensing information of a station having the address information as hidden information upon a difference time information between a frame sensing time information and a current time information being greater than a second time; and recognizing the wireless medium sensing information of the station having the address information as sense information upon the difference time information between the frame sensing time information and the current time information being smaller than the second time.

30. A method of managing a station state in a Wireless Local Area Network (WLAN) comprising at least one station and an Access Point (AP), the method comprising:

recognizing, by the AP, frame transmission state information of each station based on a frame received from each station, and broadcasting the frame transmission state information to each station;

recognizing, by each station, wireless medium sensing information of other stations based on sensed frames; and determining, by each station, hidden state information of each station based on the frame state information received from the AP and the wireless medium sensing information, wherein the at least one station is configured to transmit a frame to the AP through a Request To Send/Clear To Send (RTS/CTS) mechanism only if the at least station determines a station in the hidden state exists in the service area, wherein determining hidden state information of each station comprises mapping the frame transmission state information to the wireless medium sensing information according to the address information of each station, and either determining the station as a hidden state upon there being the same address information having the frame transmission state information indicating ON state information and the wireless medium sensing information indicating hidden sensing information, or determining a station state of the address information as a hidden state upon there being no wireless medium sensing information that corresponds to address information having the frame transmission state information indicating ON state information.

* * * * *